(12) United States Patent
Haig

(10) Patent No.: US 6,943,868 B2
(45) Date of Patent: Sep. 13, 2005

(54) APPARATUS FOR AND METHOD OF OPTICAL DETECTION AND ANALYSIS OF AN OBJECT

(75) Inventor: Nigel Douglas Haig, Savenoaks (GB)

(73) Assignee: QinetiQ Limited, Farnborough (GB)

( * ) Notice: Subject to any disclaimer, the term of this patent is extended or adjusted under 35 U.S.C. 154(b) by 241 days.

(21) Appl. No.: 10/332,803

(22) PCT Filed: Jul. 12, 2001

(86) PCT No.: PCT/GB01/02756

§ 371 (c)(1),
(2), (4) Date: Jan. 13, 2003

(87) PCT Pub. No.: WO02/04982

PCT Pub. Date: Jan. 17, 2002

(65) Prior Publication Data

US 2003/0174333 A1 Sep. 18, 2003

(30) Foreign Application Priority Data

Jul. 12, 2000 (GB) .............................................. 0016988

(51) Int. Cl.$^7$ ................................................. G01C 3/08
(52) U.S. Cl. .................... 356/5.01; 356/4.01; 356/5.08
(58) Field of Search ............................. 356/5.01, 5.04, 356/5.05, 5.08, 4.01

(56) References Cited

U.S. PATENT DOCUMENTS

| | | | |
|---|---|---|---|
| 4,413,905 A | | 11/1983 | Holzapfel |
| 4,515,472 A | * | 5/1985 | Welch ....................... 356/5.09 |
| 5,682,225 A | | 10/1997 | DuBois et al. |
| 5,892,575 A | | 4/1999 | Marino |
| 5,896,190 A | | 4/1999 | Wangler et al. |

FOREIGN PATENT DOCUMENTS

| GB | 2167261 A | 5/1986 |
|---|---|---|
| GB | 2306825 A | 5/1997 |

* cited by examiner

Primary Examiner—Bernarr E. Gregory
Assistant Examiner—Isam Alsomiri
(74) Attorney, Agent, or Firm—Nixon & Vanderhye P.C.

(57) ABSTRACT

An apparatus for detection and analysis of optical systems. Prior art systems exploit the phenomenon of photon scattering in order to range the distance of objects from the ranging apparatus. However, no information other than the distance of the target object is obtained from such systems. There is therefore provided an apparatus that exploits the technique of single photon counting and the phenomenon of retro reflection to provide information about a target optical system. Such information can be analysed and compared against known optical systems to provide a means of identification. Alternatively such information can be used as a method of quality control when constructing precision optical instruments such as telescopes or microscopes.

15 Claims, 7 Drawing Sheets

APPARATUS FOR AND METHOD OF OPTICAL DETECTION AND ANALYSIS OF AN OBJECT

The present application is a U.S. National Phase (371 application) of PCT/GB01/02756.

BACKGROUND OF THE INVENTION

1. Field of the Invention

The present invention relates to an apparatus for optical detection and analysis and in particular an apparatus for identification of a selected optical system.

Light beams will interact with any object in such a way that some energy will be diverted or converted. Depending on whether the object consists of refractive or reflective interfaces such interactive mechanisms will include scattering, reflection and refraction, all of which differ in efficiency within any given optical system depending on the light wavelength and the physical characteristics of the object.

For example, the phenomenon of scattering is what underlies the operation of known optical range-finding systems such as a LIDAR (Light Distancing and Ranging), which is an optical equivalent of a RADAR system, or a Laser Range Finder system (LRF). In LIDAR/LRF systems a light pulse is sent out from the system which then waits for any return signals. By timing the interval between transmission and reception the distance to the target object can be calculated. The operation of such systems is covered in "*Introduction to Radar Systems*" by M. I. Skolnik (McGraw Hill).

A problem with existing LRF/LIDAR systems is that they provide no information about a target system other than how far away it is. Target identification is crucial in, for example reconnaissance and surveillance situations and therefore it would be desirable for an optical range-finding system to also be capable of identifying the type of optical system being ranged.

Positional analysis of optical systems is also important in the production of complex optical systems, such as microscopes, telescopes etc., from the point of view of quality control. Currently, the position of optical components within such systems must be inferred from the optical performance of the system measured via interferometers or Modulation Transfer Function (MTF) equipment. It would therefore be desirable to have a device capable of directly measuring the position of optical components within a built up optical system.

2. Discussion of Prior Art

It is possible to exploit one of the other interactive mechanisms mentioned above in order to obtain more information about a target system. If an optical system is illuminated by a light source some light will be reflected back towards the light source—this is the phenomenon of RetroReflection. If a light detector is used in conjunction with a light source then the presence of an optical system can be detected.

The simplest example of a system in which RetroReflection occurs is an everyday simple mirror. Another example of a RetroReflection generator is the "Cat's Eye" system used on roads. In this device light, from car headlights, is focused onto the surface of a reflector and retroreflected out again.

The presence of a "mirrored" reflector is not necessary for RetroReflection to occur. Whenever an optical wavefront encounters a change in refractive index, it changes its velocity slightly since the speed of light is different in different materials. If the wavefront encounters a refractive surface at an angle the net result is that the transmitted beam of light bends, the process of refraction. However, this simple view of the interaction takes no account of the imperfection of the interface between the two materials. In much the same way that electrical cables need to be impedance matched into their terminating loads then light waves need to be impedance matched across refractive boundaries. For the case of a light ray which has normal incidence at a refractive boundary it was shown by Fresnel that the refractive indices, $n_1$ and $n_2$, of the materials on each side of the boundary cause a certain proportion of the incident light to be reflected in the ratio:

$$r = (n_1 - n_2)^2 / (n_1 + n_2)^2$$

For the case of a vacuum/glass transition ($n_1=1.000$; $n_2=1.5$) this surface reflection ratio is 4.2% and there will therefore be RetroReflection generation. In other words if a glass or plastic system is illuminated by a light source there will still be RetroReflection which can be exploited to obtain information about the target.

Most optical systems will, however, have some sort of structure. For example, binoculars have an internal structure consisting of a series of lenses and prisms all of which will RetroReflect. Since each optical surface will RetroReflect some of the incident irradiating light there will be multiple retro-reflected light signals which will vary between different optical systems. Therefore, different optical systems will have different "optical signatures" and it should be possible to analyse the signature to determine the characteristics of the target optical system. It should be noted that the term "optical system" need not refer to a system that consists of a series of glass lenses—any object that has a series of reflecting surfaces, be they "mirrored" surfaces or glass/air transitions or otherwise, should be considered as an optical system. The human eye, for example, will also generate an optical signature.

However, the method by which the "optical signature" is extracted from the reflected light will be crucial. This is because even in the simplest optical systems the returning combination of wavefronts is likely to be very complex due to multiple internal reflections. If a highly coherent light source, such as a laser, is used then the reflected wavefronts will be able to vectorially add and subtract resulting in an interference pattern (this is due to the fact that spatial coherence means that the reflected wavefronts bear a fixed relationship to one another and are therefore able to optically interfere). Attempting to use such an optical interference pattern as the "optical signature" will result in problems due to the short wavelength of light. Firstly, the components of optical systems do not normally require to be assembled to interferometrically close tolerances and so optical systems produced successively on the same production line would have differing signatures. Secondly, the wavelength of light is much smaller than the path differences induced by the passage of a light beam through the atmosphere under normal meteorological conditions and any intereference pattern will therefore be swamped by fluctuations caused by the atmosphere.

Although atmospheric turbulence will rapidly wreck the structure of an optical interference pattern the temporal coherence of a light beam is fairly well insensitive to atmospheric effects. This is because the effective temporal coherence length of photon bunches within a light pulse is much greater than the path length variations due to density differences. Therefore, there will be an "optical signature" associated with the timing of individual groups of photons arriving at a detector that represent the RetroReflection from each surface of an optical system.

In order for the structure of the target optical sight to be resolved the light pulses generated by the light source will have a certain size limit depending on the target optical system. Bearing in mind that light can travel 30 centimetres in one nanosecond then to resolve components that are separated by 15 centimetres (outward and return journey of the light beam means this distance is effectively 30 cm) the source will have to generate light pulses which are equal to or less than one nanosecond in duration. Light pulses of approximately such duration or less are hereinafter referred to as "ultrashort" pulses. Note: Since optical components are often much closer then 15 centimetres, much shorter pulses are required, of the order of tens of ferntoseconds.

SUMMARY OF THE INVENTION

According to the present invention there is provided an apparatus for detecting and analysing an optical system consisting of a number of partially reflecting surfaces comprising
i) light generating means for generating and emitting a plurality of ultrashort (as herein defined) source pulses of light towards the optical system;
ii) a detector for detection of reflected light signals, the detector being capable of discriminating the arrival of reflected light signals to a time interval of the order of the length of the emitted pulses;
iii) synchronisation pulse generator means which is arranged to provide a timing reference against which the arrival time of each detected reflected signal can be measured, and;
iv) signal processing means arranged such that the time interval between the arrival of each reflected signal and the temporally adjacent synchronisation pulse can be computed
wherein
v) the apparatus is operated such that the mean number of photons per source pulse that are reflected by the optical system and collected by the detector is $\leq 1$, and
vi) the signal processing means is arranged to generate a histogram of reflected pulses as a function of the computed time interval and to compute the relative spatial positions of the reflecting surfaces within the optical system.

Correspondingly, according to the present invention, there is provided a method of detecting and analysing an optical system consisting of a number of partially reflecting surfaces comprising the steps of:
i) generating and emitting a number of ultrashort (as herein defined) source pulses of light towards an optical system;
ii) detecting the light signals reflected by the optical system;
iii) generating a timing reference consisting of a series of synchronisation pulses, and;
iv) computing the time interval between the arrival of each reflected signal and the temporally adjacent synchronisation pulse
wherein
v) step (i) above is operated such that the mean number of photons per source pulse that are reflected by the optical system and collected by the detector is $\leq 1$, and said method comprises the further steps of:
vi) generating a histogram of the reflected signals as a function of the computed time interval, and;
vii) computing the relative spatial positions of the reflecting surface within the optical system.

The apparatus works by emitting a series of ultrashort light pulses which strike the target optical system thereby producing a number of reflected signals whose time of arrival at the detector can be computed by correlation with a suitable system synchronisation pulse. The synchronisation pulse could be the emitted light pulse itself or an independent timing pulse within the apparatus' electronics. Over time the apparatus will build up a histogram of reflected pulses as a function of the timed interval between each of the detected reflected signals and the temporally adjacent synchronisation pulse. Since returns from different reflecting surfaces within the target optical system will each be separated by different time intervals from their temporally adjacent synchronisation pulse the spatial separations of the source surfaces can be calculated.

In order that the detector within the apparatus is not swamped with too many photons the system needs to be operated in a time-correlated single photon detection mode, i.e. statistically the mean number of photons in each source pulse reflected back to the detector by the target optical system needs to be less than or equal to one. In order to achieve such a low photon detection rate a suitably low powered light source is used. In operation this means that a number of source pulses may have to interact with the optical system before a photon is returned to the detector. Conveniently a photon detection rate of one detected photon for every ten source pulses will result in a well behaved system.

Conveniently, the apparatus can be time correlated if the emitted light pulses are used as the synchronisation pulses such that the light generating means and the detector provide the start/stop pulses for the signal processing timing circuitry. In this way the relative separations of reflecting surfaces on the optical system can simply be derived.

If the source pulses are sufficiently short in duration and the interval between the target surfaces sufficiently great then each surface will produce a separate return whose relative separations are sufficient to characterise the target. If the source pulses are longer and/or the surfaces closer together then the returns will overlap producing a longer envelope pulse. Since the time amplitude shape of each source return conforms to that of the source pulse the envelope pulse can be split into its individual components by applying a suitable mathematical de-convolution model to the reflected returns data. Leading edge fitting processes, wavelet and derivative analysis are all suitable models for recovering the structure of the target optical system.

Conveniently, an ultrashort pulse diode laser, such as a PicoQuant diode laser, can be used to generate the light pulses.

Many optical systems have components which are separated by as little as 5 millimetres and so preferably the light source should also ideally be capable of generating pulses of around $\frac{1}{30}$ nanosecond ($\approx 33.3$ picoseconds) in duration. It should be noted however that the apparatus will probably function satisfactorily even if the light source is not capable of resolving individual surfaces with separations of around 5 mm. This is because the optical components within the optical system will have larger scale structures corresponding to the separations between groups of components. Furthermore, the use of a de-convolution technique such as described above will enable the structure of the target optical system to be deduced.

In order that the reflections generated by successive pulses from the light generating means do not overlap when they reach the detector, the outgoing pulses should preferably have a minimum separation. For reflecting surfaces of separation z then the separation y between successive pulse maxima should be y≧2z. This equates to a pulse repetition rate f≦c/2z, where c is speed of light. So for the case where the optical components are separated by 5 millimetres the pulse repetition rate must be less than 30 GHz.

Conveniently the signal to noise ratio can be increased, thereby aiding data acquisition rates, by transmitting light pulses whose wavelengths correspond to the Fraunhofer absorption lines in the solar spectrum.

Suitable detectors for the detection of reflected pulses are diode detectors or photomultiplier tubes. It is important to choose detectors with a fast impulse response time and as short a recovery time (the period of time which the detector takes to "recover" from detecting an incident light pulse) as possible. The effects of these two factors are discussed later. Since the detectors will be "off-line" for periods of time it is preferable that the signal processing means build up a histogram of reflected pulses as a function of the timed length between the synchronisation pulse and the detected reflected signals in order to build up the optical signature.

Return pulses can conveniently be separated into very short time intervals of the order of femto- to nanoseconds by using a Time to Amplitude Converter (TAC) which will place return pulses received by the detector into time "bins" from which the target signature can be derived. The output from the TAC and signal processing electronics could be displayed graphically to allow identification to be performed by eye or more preferably the output can be analysed by a suitable computer program (similar to a sonar signature or drug spectrogram identification program) capable of identifying the signature with respect to a stored database of known target signatures.

Conveniently the speed of detection can be increased by making the apparatus cover a much wider field of view by either raster scanning or using an alternative detector such as a charge coupled detector array.

The apparatus could be made more covert if desired by arranging the light generating means to be capable of frequency hopping between a number of different and distinct light frequencies.

The apparatus described is capable of detection, analysis and identification. Preferably the ability to range an optical system can be added to the apparatus either by operating the apparatus in conjunction with a separate rangefinder or by transmitting and detecting using first-pulse logic.

As well as being used to detect and identify remote optical systems the apparatus described could be used to check the positioning of optical elements within a precision optical system such as a telescope or microscope, i.e. it could be used for quality control.

BRIEF DESCRIPTION OF THE DRAWINGS

Embodiments of the invention will now be described by way of example only with reference to the accompanying drawings in which.

DETAILED DISCUSSION OF EMBODIMENTS

Figure 1:
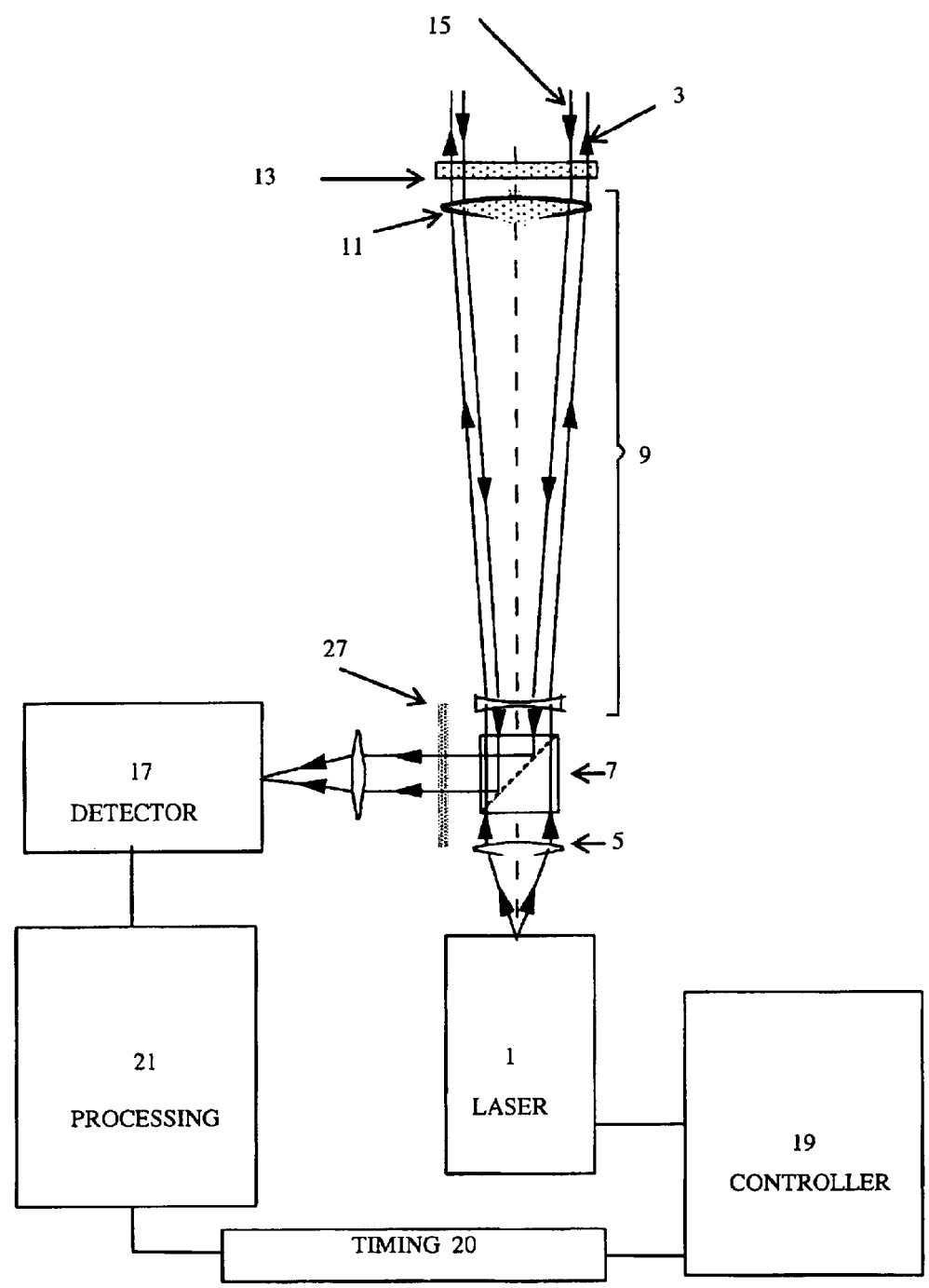
FIG. 1 shows the invention according to a first configuration ("monostatic" configuration)

FIG. 1 shows an example of a "monostatic" configuration for the invention, i.e. a configuration in which there is a single optical system for both the probe beam output and the return beam collection. This monostatic configuration is the version of the invention tested and described in the later figures.

In FIG. 1, a semiconductor laser 1 emits 70 picosecond pulses at a repetition rate of 20 MHz and a power level of around 1 mW (The laser 1 used was a PicoQuant PDL 800 with a wavelength of 640 nanometres). The probe beam 3 produced by the laser 1 passes through a collimating lens 5 and then through a polarising beamsplitter 7. The polarised beam then passes through a telescope 9 and is collimated by the telescope's objective lens 11. Finally the beam passes through a quarter wave plate 13 before continuing onto the target (not shown).

The return signal 15 (which consists of reflected outward pulses) passes once again through the quarter wave plate 13. Thus the polarisation of the return signal 15 is rotated by 90° with respect to the outward probe beam 3 which enables the probe beam 3 and return signal 15 to be separated by the beamsplitter 7. The beamsplitter 7 reflects the return signal 15 into the detector 17.

The laser 1 is controlled by a laser output controller 19. The laser output controller 19 and detector 17 are linked to timing circuitry 20 which uses the technique of time correlated photon counting in order to resolve the structure of the target. Time correlated counting is a well understood technique and here the detector 17 (and therefore the return signal 15) provides the start pulses for the timing circuitry and the laser controller 19 provides the stop pulses. Note: this timing technique results in a time reversal in the data such that shorter time delays are from returns further away in the detector than those which give rise to longer time delays (see FIG. 3).

The apparatus is operated in a single photon detection mode and so in order to analyse the target optical system the return signals must be integrated over time and therefore a histogram of reflected signals versus time delay is formed. Either this can be displayed graphically for visual analysis (not shown) or the data can be analysed by the signal processing unit 21 in order to identify the "optical signature" of the target system. The skilled man will realise that by reducing the recovery time of the detector (i.e. that time during which the detector is "recovering" after receiving a signal) will enable the system to operate at higher photon count and source pulse emission rates so that the integration time needed to produce a useful optical signature will go down.

Figure 2:
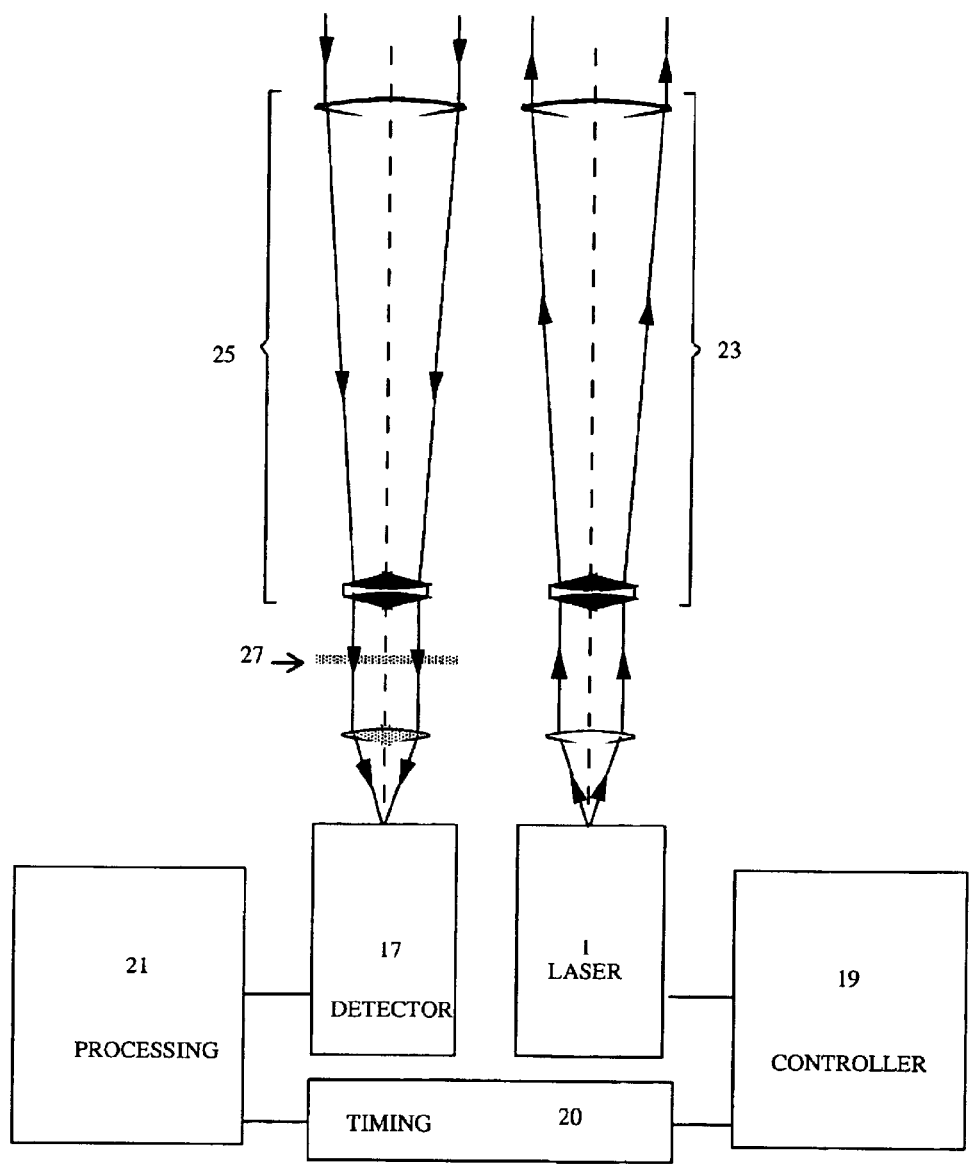
FIG. 2 shows the invention according to a second configuration ("bistatic" configuration)

FIG. 2 shows a bistatic configuration for the invention in which two separate optical systems are used, a transmitting telescope 23 and a receiving telescope 25. This configuration is not markedly different from the monostatic configuration (In FIG. 2 like numerals are used to identify identical elements of the device to those shown in FIG. 1) but the use of two separate optical systems removes the requirement for a polarising beamsplitter and a quarter wave plate increasing throughput and potentially the signal to noise ratio.

In both the monostatic and bistatic configurations a narrow band filter 27, tuned to pass the light wavelength of the laser 1, can be added to the system to reduce the amount of noise received.

It will be obvious to the skilled man that there are equivalent configurations to the ones shown in FIGS. 1 and 2 using alternative components, such as reflecting optics, holographic filters, grating filters, fibre filters etc. Furthermore, in FIG. 1 the quarter wave plate 13 could actually be placed anywhere on the telescope side of the beamsplitter 7. Also, even though a cube beamsplitter is shown there are other functionally equivalent configurations.

Figure 3:
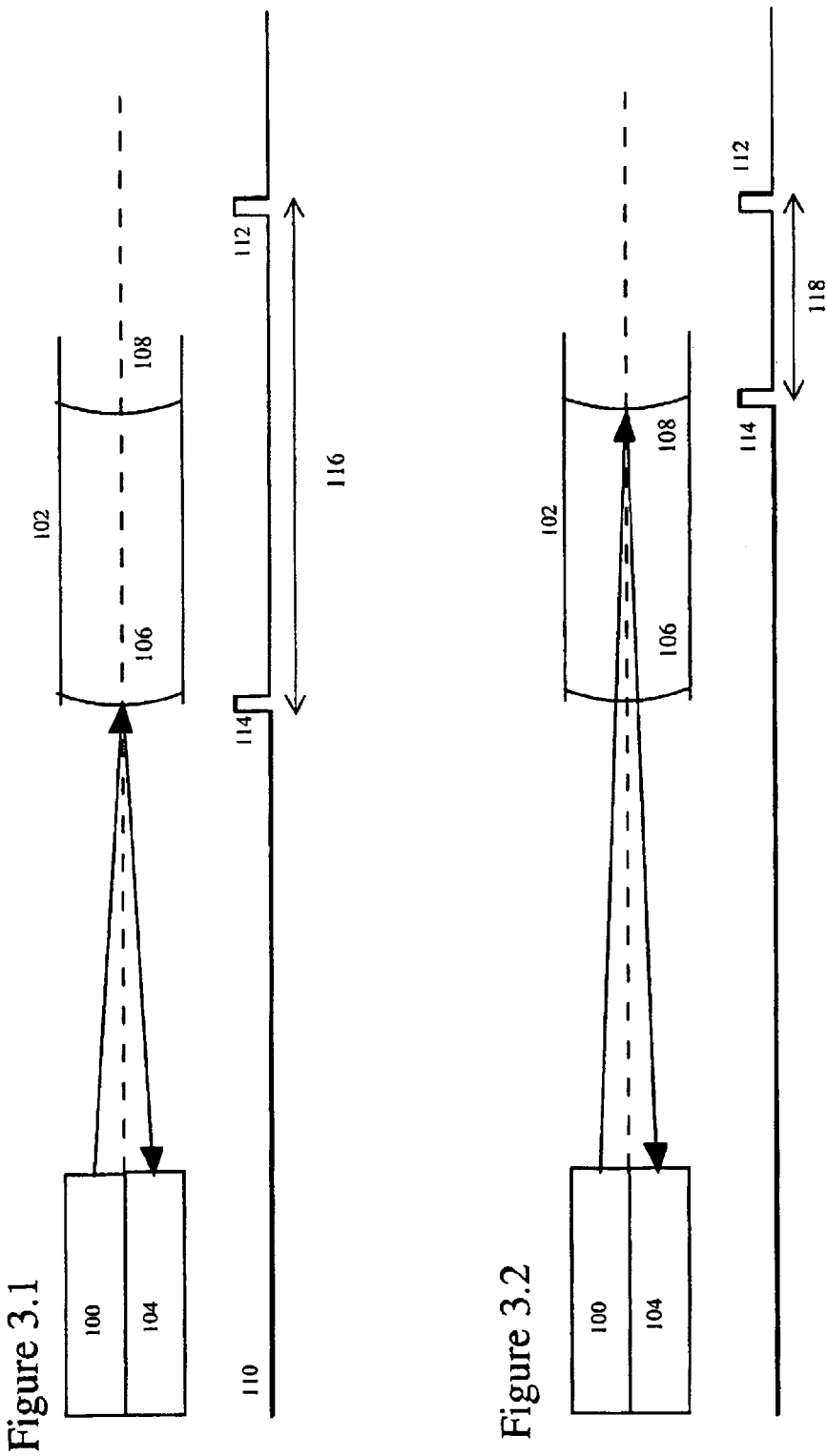
FIGS 3.1 and 3.2 show diagrammatically the process of time correlated photon counting

Maximum detector count rate is achieved when the apparatus is set up to be "reverse" time correlated since the timer is triggered only when a photon is detected. Reverse time correlation results in a "time reversal" of the data—shorter time delays are from returns further away from the detector than longer time delays. See FIG. 3. FIGS. 3.1 and 3.2 show a simplified version of the apparatus analysing an optical system. The light generating means 100 fires a series of light pulses at the target 102 which reflects some of the incident light energy back to the detector 104. The target is shown to comprise two optical elements 106, 108. A timeline 110 represents what the detector "sees".

In FIG. 3.1 the apparatus is shown detecting the first surface 106. The reflected signal produces a photon counting event 114 within the detector 104 which triggers the timing circuitry within the signal processing electronics (not shown), the start pulse. The stop pulse for this timing circuitry is provided by the next emitted light pulse which represents the synchronisation pulse 112. In FIG. 3.1 therefore the time difference measured by the apparatus is shown on the timeline 110 as the period 116.

In FIG. 3.2 the apparatus is analysing the second optical surface 108. The initial photon counting event 114 therefore appears further down the timeline and so the time gap 118 between the start pulse 114 and the stop pulse 112 is smaller. In other words optical surfaces that are further away from the detector result in a shorter time interval.

Figure 4:
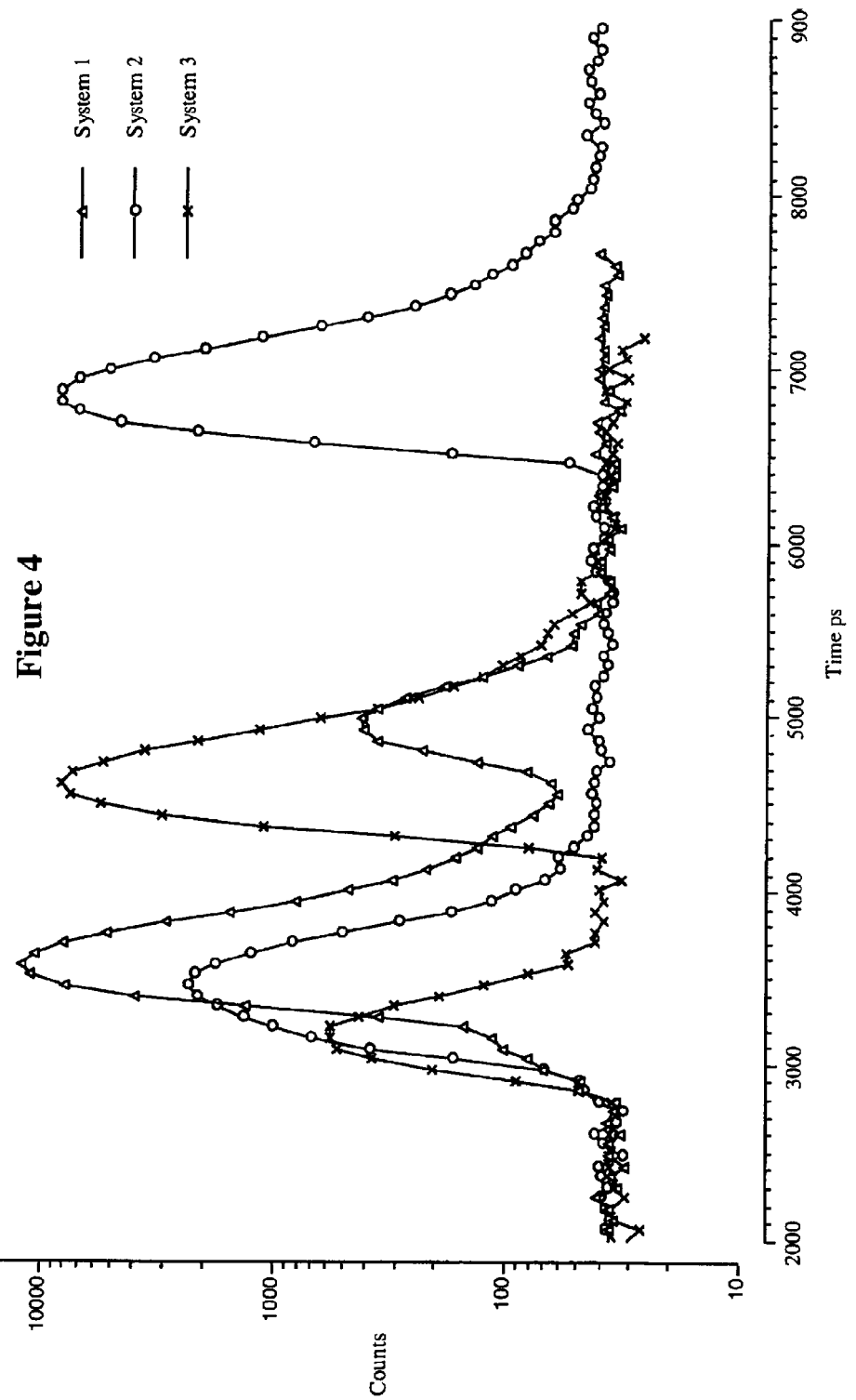
FIG. 4 shows a comparison of the results of using the apparatus of the invention against three different types of optical systems

FIG. 4 shows experimental traces of three different optical sighting systems at a range of 1.2 kilometres. The signatures are displayed for the case when the first surfaces of the targets are at exactly the same distance from the apparatus in order to demonstrate three things. Firstly the signatures are all different which implies that they could be used to positively identify their respective optics. Secondly, the distribution of the families of peaks reveals internal structure of the optics (note that the peaks do not appear in the same positions for all three systems) and thirdly that the distance between the first and last peaks of each sight gives an optical path length of the target.

Figure 5:
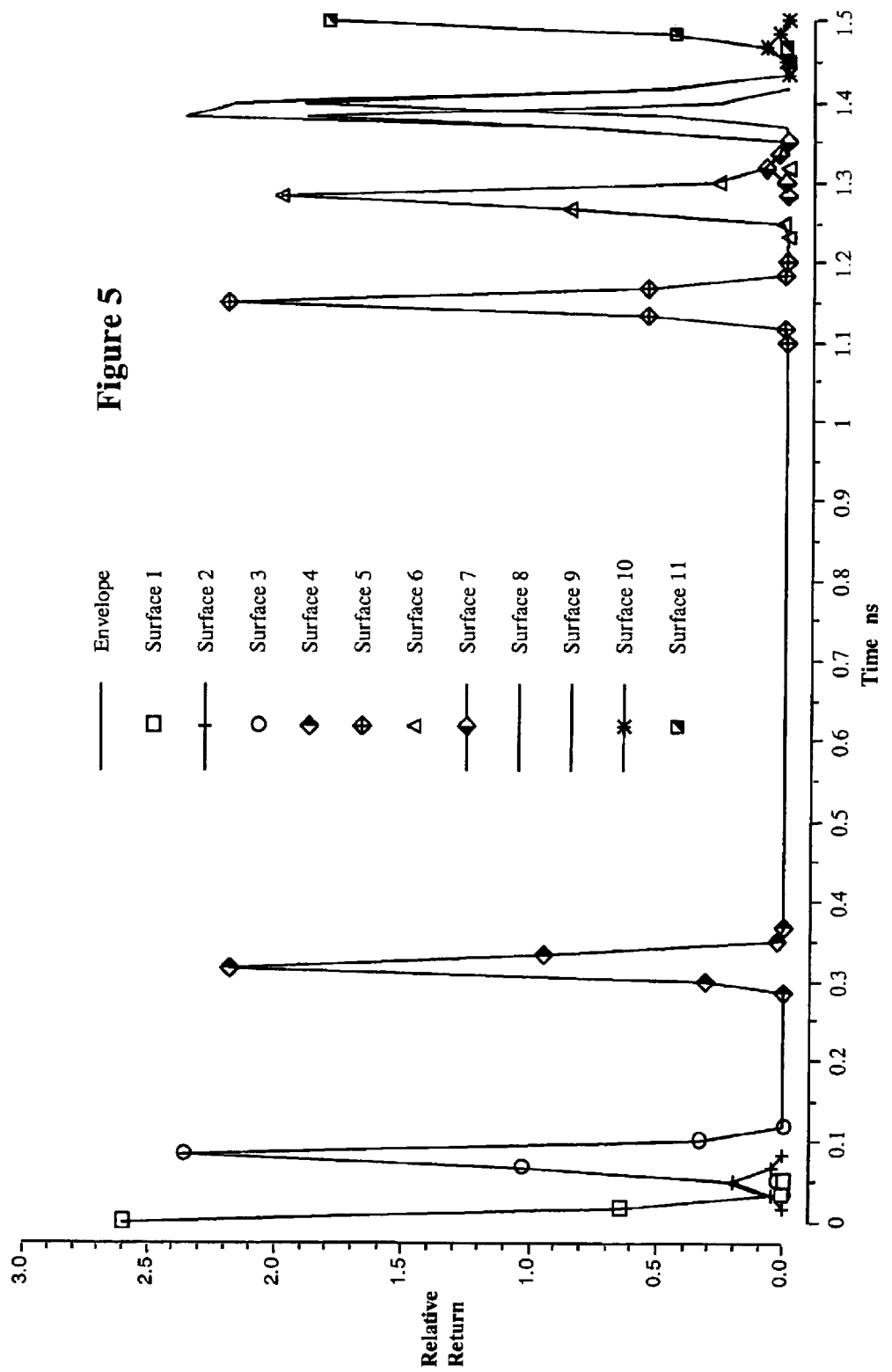
FIG. 5 is a theoretical plot of Counts versus optical path for an ideal signature from an optical system comprising eleven separate components with an ultra-fast detector
Figure 6:
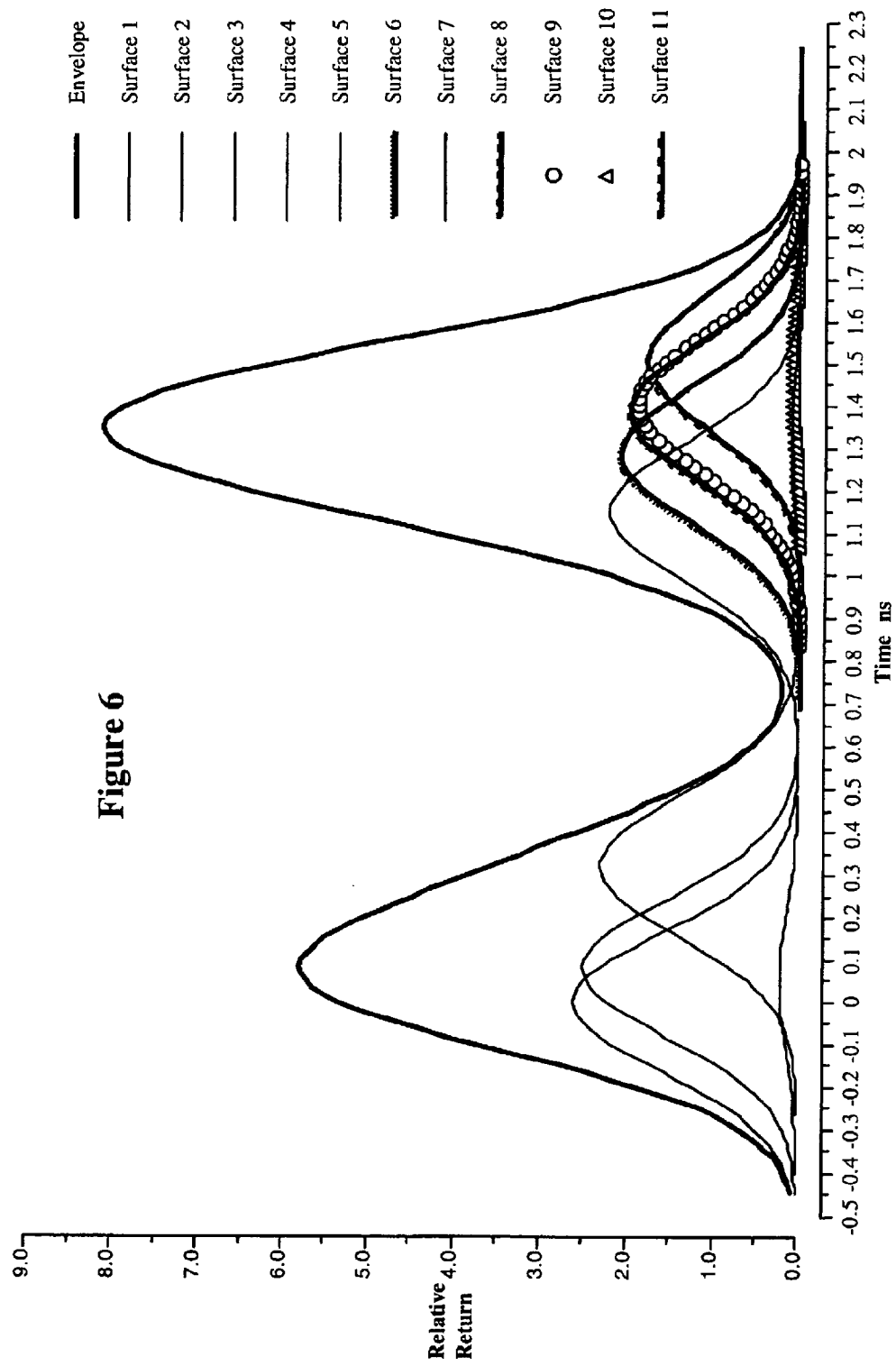
FIG. 6 shows the actual signature obtainable from the same set up as in FIG. 6 with current detector technology

FIGS. 5 and 6 show how theoretical results match up to currently achievable results. FIG. 5 shows the signature expected from a complex optical system comprising eleven separate optical components with a detector having a standard deviation of 0.01 nanoseconds. The effects due to all eleven optical surfaces present within the sight are added to produce the envelope which resembles a series of spikes. FIG. 6 on the other hand shows the trace produced when using the best detector currently available which has a standard deviation of only 0.16 nanoseconds. However, even on this basis useful information can be obtained. This is because the system will be detecting the coarser optical signatures due to different groups of optical surfaces within an optical system. Therefore, as long as the operator or signal processing electronics are aware of the detection capabilities of the system then useful comparisons against other systems resolved at the same level can be achieved.

It will be obvious therefore to the skilled man that the detecting capability of the invention will improve as detectors with a faster impulse response are developed.

Figure 7:
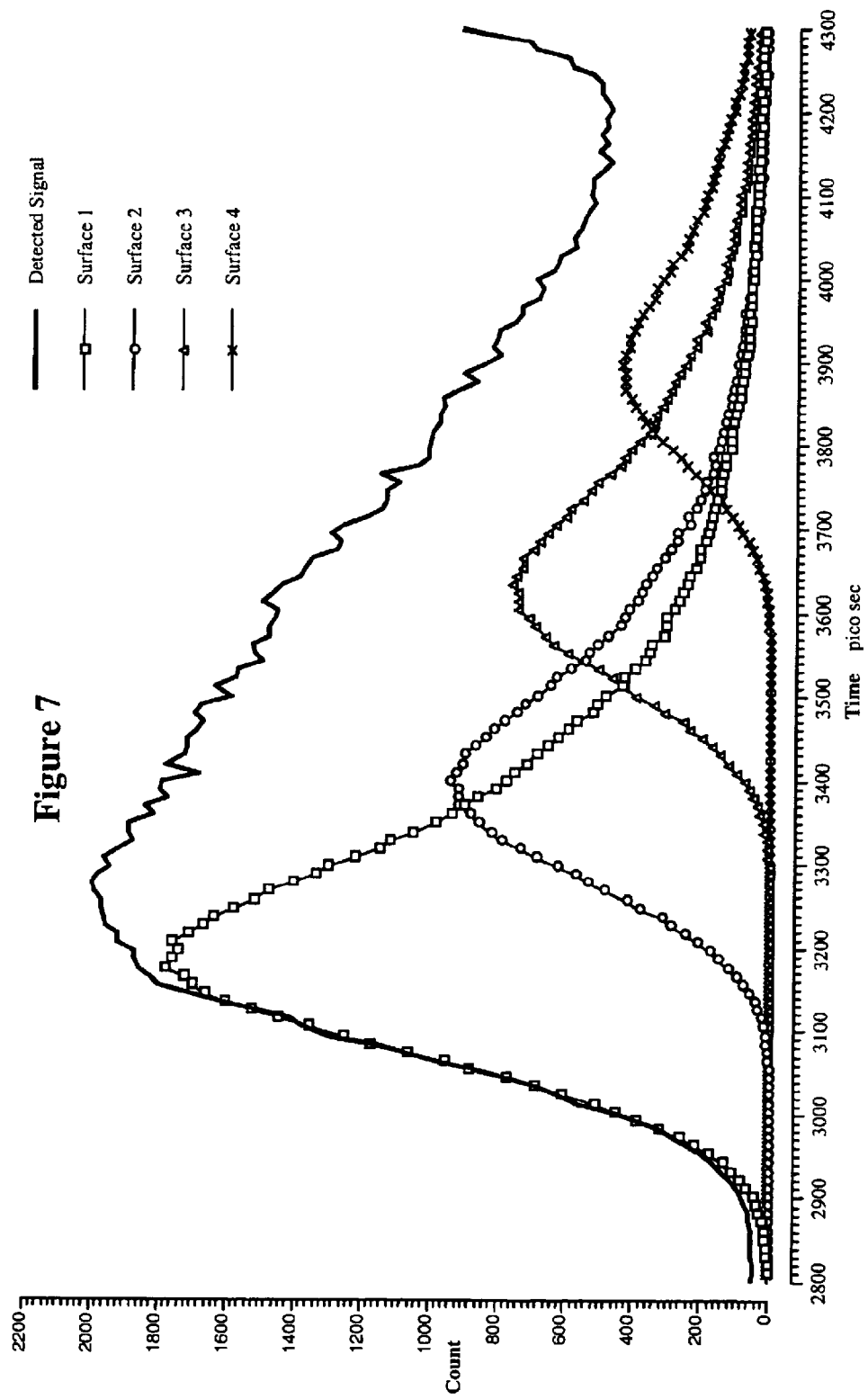
FIG. 7 shows the results of applying a de-convolution technique to the optical signature

As discussed above de-convolution techniques could be applied to the detected optical signature in order to resolve the signal into its individual components. FIG. 7 shows how an envelope signal can successfully be de-convolved using in this case a leading edge fitting process to reveal the four individual optical components (Surfaces 1–4) within the optical system.

What is claimed is:

1. An apparatus for computing the relative spatial position of a number of partially reflecting surfaces in an optical system, said apparatus comprising:

light generating means for generating and emitting a plurality of ultrashort source pulses of light not greater than one nanosecond in duration towards the optical system;

a detector for detection of light signals reflected from said partially reflecting surfaces, and for discriminating the arrival of reflected light signals to a time interval of the order of the length of the emitted pulses;

synchronisation pulse generator means for providing a timing reference against which the arrival time of each detected reflected signal can be measured, and;

iv) signal processing means for computing the time interval between the arrival of each reflected signal and the temporally adjacent synchronisation pulse, wherein the mean number of photons per source pulse that are reflected by the optical system and collected by the detector is $\leq 1$, and the signal processing means generates a histogram of reflected pulses as a function of the computed time interval and the relative spatial positions of the reflecting surfaces within the optical system.

2. An apparatus as claimed in claim 1 wherein the emitted light pulses are used as the synchronisation pulses such that the emitted and detect pulses/signals provide the start/stop pulses for the signal processing circuitry.

3. An apparatus as claimed in claim 2 wherein the apparatus is reverse time-correlated.

4. An apparatus as claimed in claim 1 wherein the signal processing means additionally applies a de-convolution algorithm to the detected reflected light signals.

5. An apparatus as claimed in claim 1 wherein the light generating means is a pulse laser diode.

6. An apparatus as claimed in claim 1 wherein the wavelength of the light pulses corresponds to a Fraunhoffer wavelength.

7. An apparatus as claimed in claim 1 wherein the detector is a photomultiplier tube.

8. An apparatus as claimed in claim 1 wherein the detector is a diode detector.

9. An apparatus as claimed in claim 1 wherein the signal processing means includes a time to amplitude converter.

10. An apparatus as claimed in claim 1 wherein the output from the signal processing means is analysed by a computer program capable of identifying the optical signature of the target optical system with respect to a stored database of known optical signatures.

11. An apparatus as claimed in claim 1 wherein the apparatus is capable of raster scanning a field of view.

12. An apparatus as claimed in claim 1 wherein the detector comprises a charge coupled detector array.

13. An apparatus as claimed in claim 1 wherein the light generating means is capable of frequency hopping.

14. An apparatus as claimed in any preceding claim wherein the apparatus is operated in conjunction with a rangefinder.

15. A method of computing the relative spatial position of a number of partially reflecting surfaces of an optical system, said method comprising the steps of:

i) generating and emitting a number of ultrashort source pulses of light not greater than one nanosecond in duration towards an optical system;

ii) detecting the light signals reflected by the partially reflecting surfaces of the optical system;

iii) generating a timing reference consisting of a series of synchronisation pulses;

iv) computing the time interval between the arrival of each reflected signal and the temporally adjacent synchronisation pulse, wherein in step (i) the mean number of photons per source pulse that are reflected by the optical system and collected by the detector is $\leq 1$;

v) generating a histogram of the reflected signals as a function of the computed time interval; and vi) computing the relative spatial positions of the partially reflecting surface within the optical system.

* * * * *